S. G. LIPSCOMB.
MACHINE FOR SLICING PICKLES AND THE LIKE.
APPLICATION FILED APR. 24, 1912.

1,072,628.

Patented Sept. 9, 1913.
5 SHEETS—SHEET 1.

Witnesses

Sylvester G. Lipscomb, Inventor
by C. A. Snow & Co.
Attorneys

S. G. LIPSCOMB.
MACHINE FOR SLICING PICKLES AND THE LIKE.
APPLICATION FILED APR. 24, 1912.

1,072,628.

Patented Sept. 9, 1913.

5 SHEETS—SHEET 3.

Witnesses

Sylvester G. Lipscomb Inventor
by C. A. Snow & Co., Attorneys

S. G. LIPSCOMB.
MACHINE FOR SLICING PICKLES AND THE LIKE.
APPLICATION FILED APR. 24, 1912.
1,072,628.
Patented Sept. 9, 1913.
5 SHEETS—SHEET 4.
Fig. 11.
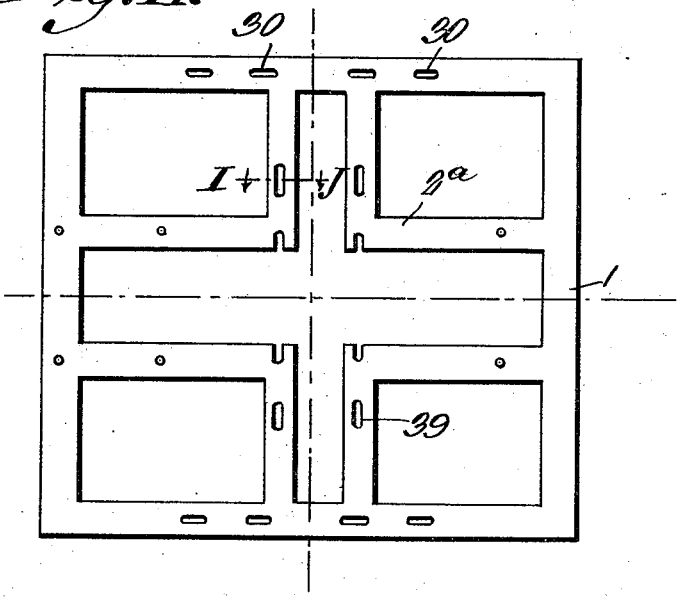
Fig. 12.
Fig. 13.
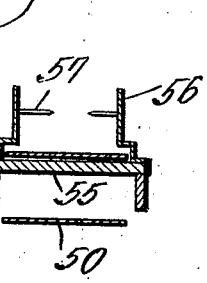
Fig. 5.
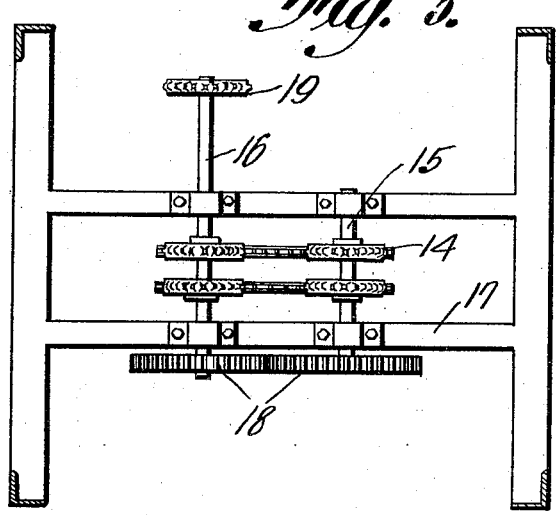
Witnesses
Sylvester G. Lipscomb, Inventor
by C. A. Snow & Co., Attorneys S. G. LIPSCOMB.
MACHINE FOR SLICING PICKLES AND THE LIKE.
APPLICATION FILED APR. 24, 1912.
1,072,628.
Patented Sept. 9, 1913.
5 SHEETS—SHEET 5.
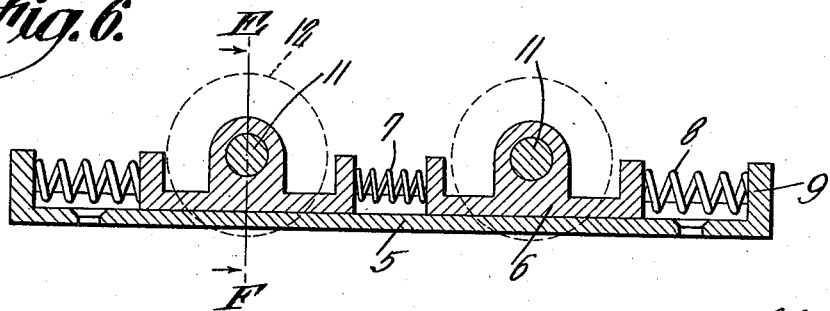
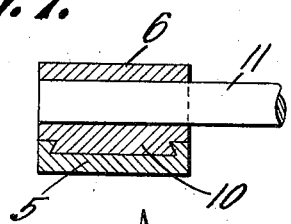
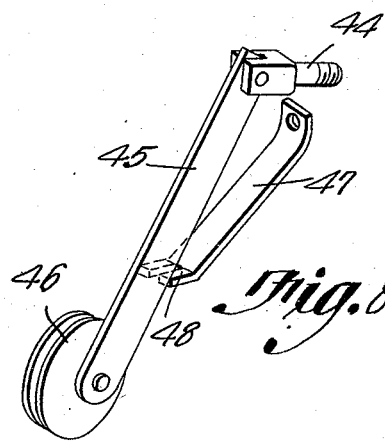
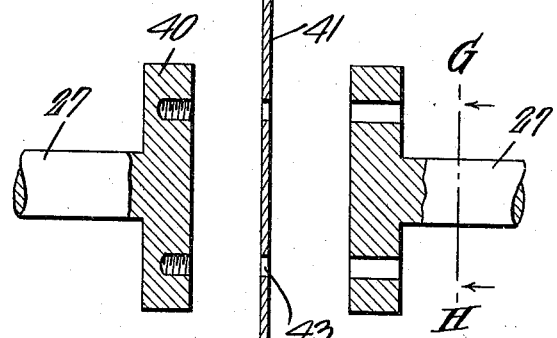
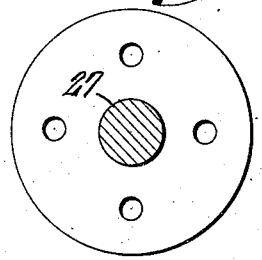
Witnesses
Sylvester G. Lipscomb, Inventor
by C.A. Snow & Co.
Attorneys

UNITED STATES PATENT OFFICE.

SYLVESTER G. LIPSCOMB, OF LOUISVILLE, KENTUCKY, ASSIGNOR OF ONE-HALF TO JACOB M. JONES, OF ELIZABETHTOWN, KENTUCKY.

MACHINE FOR SLICING PICKLES AND THE LIKE.

1,072,628.     Specification of Letters Patent.     Patented Sept. 9, 1913.

Application filed April 24, 1912. Serial No. 692,977.

*To all whom it may concern:*

Be it known that I, SYLVESTER G. LIPSCOMB, a citizen of the United States, residing at Louisville, in the county of Jefferson and State of Kentucky, have invented a new and useful Machine for Slicing Pickles and the Like, of which the following is a specification.

This invention relates to machines for slicing pickles and the like, its object being to provide a simple and compact structure of this character having means whereby a pickle may be cut into two or more parts.

A further object is to provide means whereby the pickles may be fed automatically to the cutting members without danger of becoming displaced relative thereto.

A further object is to provide means whereby the pickles are caused to move end first through the machine, said machine being adjustable automatically so as to hold pickles of different sizes.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
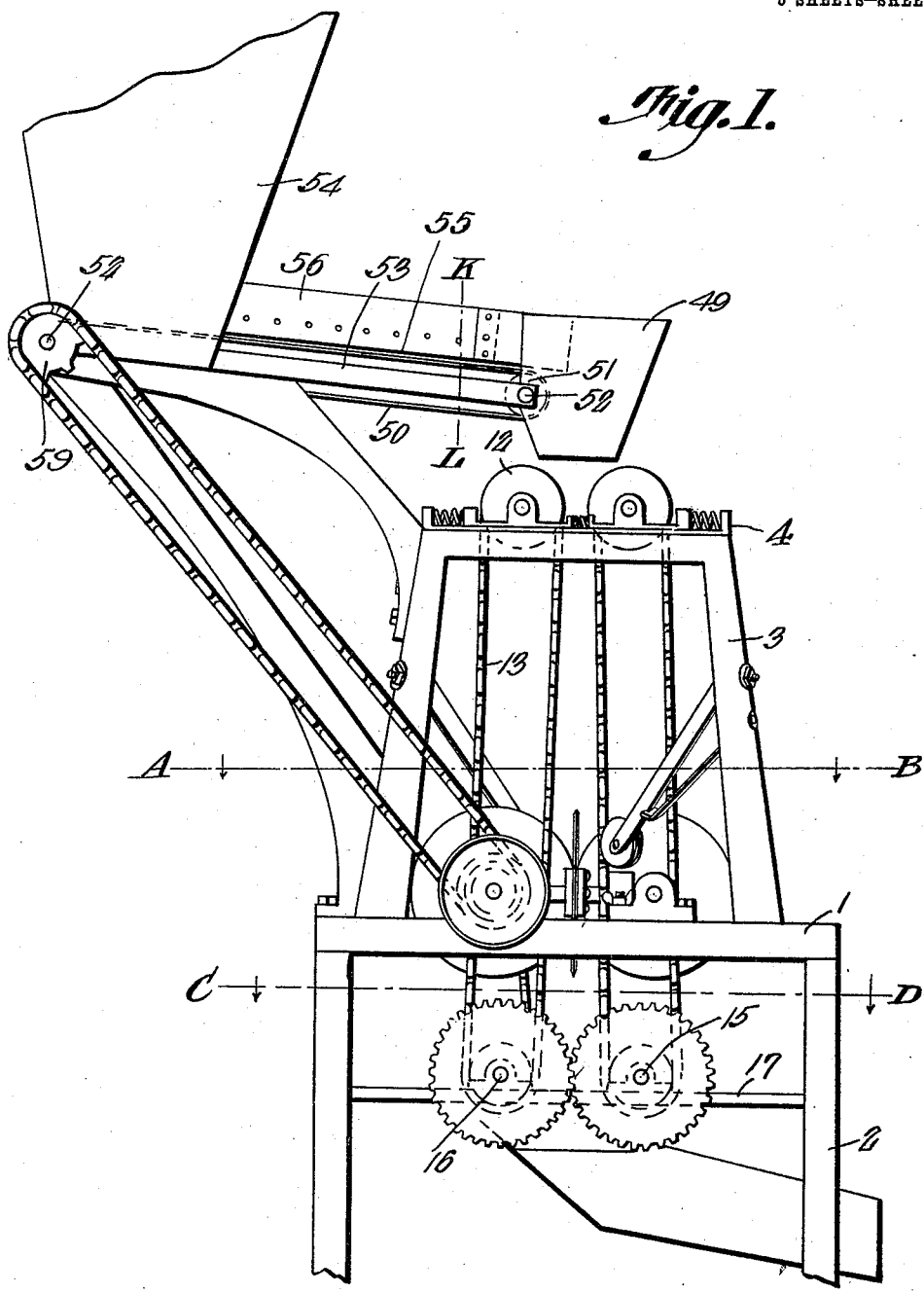
Figure 2:
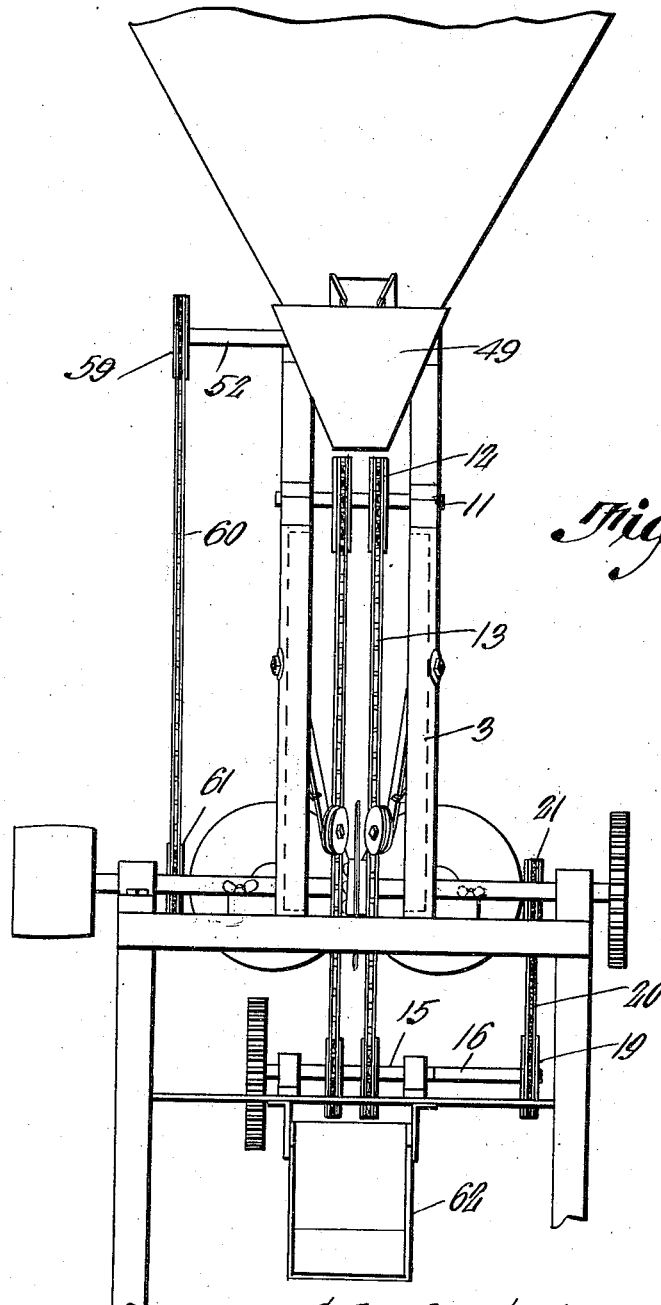
Figure 3:
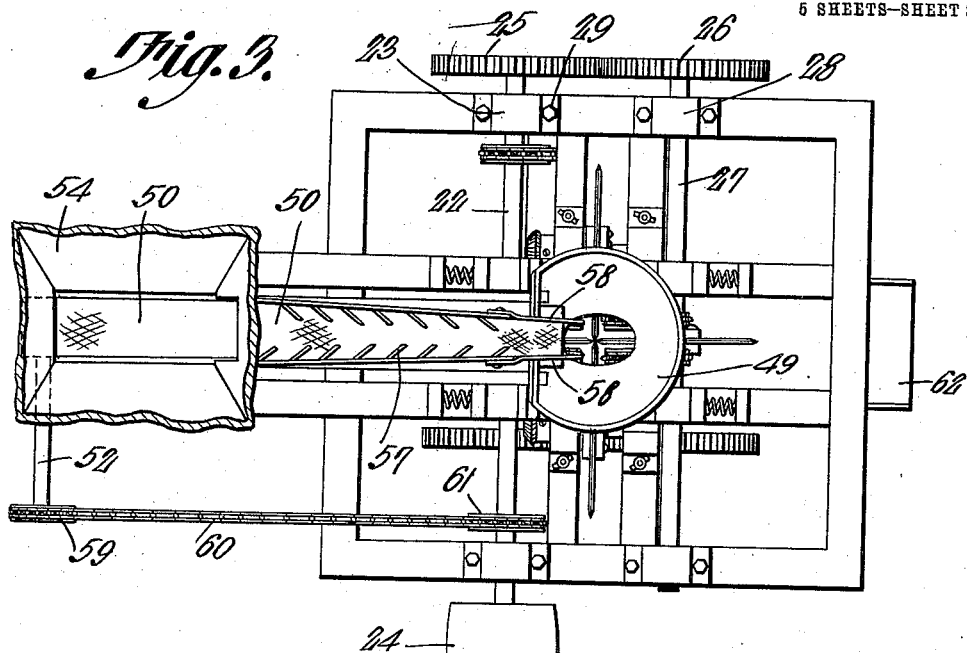
Figure 4:
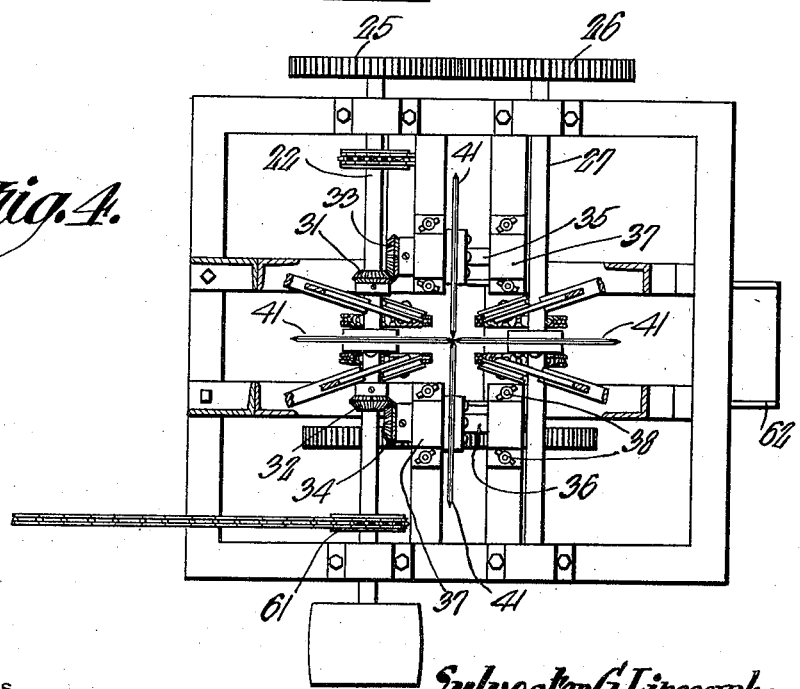

In said drawings: Figure 1 is a side elevation of the machine, portions of the legs and of the feed hopper being broken away. Fig. 2 is a front elevation of the machine. Fig. 3 is a plan view, the feed hopper being shown in section. Fig. 4 is a section on line A—B Fig. 1. Fig. 5 is a section on line C—D Fig. 1. Fig. 6 is an enlarged longitudinal section through one side of the top of the frame of the machine and through the bearings thereon. Fig. 7 is a section on line E—F Fig. 6. Fig. 8 is a perspective view of one of the idlers and its spring. Fig. 9 is a central section through one of the knives and its side blocks, the parts being shown detached. Fig. 10 is a section on line G—H Fig. 9. Fig. 11 is a plan view of the top of the main frame of the machine. Fig. 12 is an enlarged section on line I—J Fig. 11. Fig. 13 is a section on line K—L Fig. 1.

Referring to the figures by characters of reference, 1 designates the top of the main frame or casting, the same being supported by legs 2 and being preferably formed with its ends and sides angular in cross section, as shown particularly in Fig. 12. Formed within the corner portions of the frame 1 are inwardly extending angular projections 2ª on which are erected standards 3 which serve to support a smaller or upper frame 4. The sides of the upper frame are formed, in their upper faces, with longitudinal channels 5 each of which has bearing blocks 6 slidably mounted therein and normally spaced apart by means of a light spring 7 as shown in Fig. 6. Additional springs 8 are interposed between the outer ends of the blocks 6 and the end walls 9 of the channels 5, these springs 8 serving to yield readily when the blocks 6 are moved apart in the manner hereinafter set forth. As shown in Fig. 7, each block 6 has a dove tail portion 10 and this portion projects into the channel 5 and engages the walls thereof so that the blocks cannot become accidentally displaced. Parallel shafts 11 are journaled in the blocks 6 and grooved wheels 12 are arranged in pairs on these shafts, the wheels on one shaft being directly opposite the wheels on the other shaft. Endless chains 13 are mounted on these wheels and extend downwardly therefrom to sprockets 14 secured to shafts 15 and 16 which, as shown particularly in Fig. 5, are journaled on cross strips 17 supported by the legs 2 and below the main frame 1. These sprockets 14 are disposed in the same relation as are the wheels 12 and each of the shafts 15 and 16 has a gear 18 secured to one end thereof, the two gears meshing so that the shafts rotate in opposite directions and those runs of the chains nearest the center of the machine will all move downwardly.

A sprocket 19 is preferably secured to one end of the shaft 16 and receives motion, through a chain 20 from another sprocket 21 secured to a main drive shaft 22. This shaft is journaled in bearing blocks 23 mounted on the main frame 1. A drive pulley 24 is connected to one end of the shaft 22 while the other end of said shaft has a gear 25 secured thereto and meshing with a gear 26 secured to one end of a shaft 27. Said shaft 27 is journaled in bearing blocks 28 mounted on the main frame 1. These bearing blocks 28 as well as the blocks 23 are preferably fastened adjustably to the main frame by means of bolts 29 extending into slots 30 formed in the sides of the main frame, as shown in Fig. 11.

Shaft 22 is provided at intermediate points, with bevel gears 31 and 32 meshing, respectively, with gears 33 and 34 secured to shafts 35 and 36. These shafts are journaled in bearing blocks 37 which are adjustably connected to the angular extensions 2ª by means of bolts 38 projecting into slots 39 formed in said extensions, as shown in Fig. 11. Thus it will be seen that either of the shafts 35 and 36 can be readily adjusted laterally so as to shift its gear 33 or 34 out of mesh with the corresponding gear on the shaft 22. In this manner either or both of the shafts 35 and 36 can be disconnected from its driving mechanism so as not to rotate simultaneously with the shafts 22 and 27.

As shown in Fig. 9 the shaft 27 can be formed in two alining sections having disk-like heads 40 at their near or adjoining ends, these heads being adapted to clamp upon opposed faces of a cutting disk 41 having a sharp periphery, as indicated at 42. Openings 43 may be formed in the disk for the reception of fastening means extending through one of the heads 40 and into engagement with the other head so as to thus bind the heads upon the disk and secure the two shaft sections together. Not only can shaft 27 be constructed in this manner but each of the shafts 22, 35 and 36 can be similarly constructed. In any case each of these four shafts 22, 27, 35 and 36 is provided with a cutting disk 41, said disks being disposed in planes at right angles to each other, as clearly shown in Fig. 4 and having their peripheries close together.

Each of the standards 3 has a bracket 44 extending inwardly therefrom and pivotally connected to and extending downwardly from each bracket is a strip 45 having an idler 46 journaled at its lower end. A spring strip 47 is also secured to each standard 3 and has one end preferably forked, as shown at 48, so as to straddle and engage the adjacent strip 45. These springs serve to hold the idlers 46 normally pressed toward each other and as the idlers engage the innermost or active runs of the chains 13, it will be apparent that said chains will thus be held taut although capable of yielding outwardly under the spreading action of an article fed between them.

Suitably supported directly above the passes between the wheels 12 and the inner runs of the chains 13, is a substantially frusto-conical hopper 49 into which a conveyer belt 50 discharges. This belt is supported by rollers 51 secured to shafts 52 which, in turn, are journaled in a frame 53 extending from the lower or discharge end of a main hopper 54. The upper or active run of the conveyer belt 50 extends along the bottom of the hopper 54 and through an outlet opening in one wall thereof, said run also traveling over the bottom 55 of a trough 56 which extends from the outlet of the main hopper 54 and discharges into the other hopper 49. The walls of the trough 56 converge toward the discharge end of the trough, as shown particularly in Fig. 3, portions of these walls overhanging the sides of the upper run of belt 50, as shown in Fig. 13. Deflecting pins 57 extend from the inner faces of the sides of the trough 56 and converge toward the discharge end of the trough, these pins being disposed in staggered relation as shown in Fig. 3. Spring extensions 58 project from the walls of the trough at the discharge end thereof and project over the hopper 49, these spring extensions normally converging toward their free ends. One of the shafts 52 of the conveyer belt 50 has a sprocket 59 secured thereto and adapted to receive motion, through a chain 60 from a sprocket 61 secured to the main shaft 22.

When it is desired to cut pickles longitudinally into four slices approximately equal, the bearing blocks 37 are adjusted longitudinally so as to bring the gears 33 and 34 into mesh with gears 31 and 32 respectively. At the same time the blades 41 on the shafts 35 and 36 will be brought close together and at opposite sides of the adjoining parts of the other two cutting disks 41. The machine is then set in motion and the pickles to be cut are placed in the hopper 54. The upper run of the belt 50 conveys pickles through the outlet of the hopper and longitudinally within the trough 56. The pins 57 are engaged by the pickles and serve to hold said pickles back so that they can pass only one at a time, through the trough. Each pickle, as it leaves the trough, passes between the light spring extensions 58 and these extensions serve to center the pickle within the hopper 49 so that, when it drops thereinto, it will fall end first into the reduced outlet opening of the hopper 49. As the pickle falls through the said outlet opening it drops end first into the pass between the innermost runs of the chains 13 and is engaged by said chains. If the pickle is larger than the space between the chains, it will exert a wedging action between the wheels 12 and cause the springs 8 to yield sufficiently to permit the pickle to pass between the wheels 12. The innermost runs of the chains 13 then engage the article to be cut and convey it downwardly to the rotating circular knives 41. These knives will cut into the article as it is moved longitudinally past them by the chains and will sever it into four substantially equal parts. These parts, upon being severed, will drop into a delivery trough 62 supported under the lower portions of the chains 13. It will be seen that the idlers 46 are located between the cutting disks or blades and thus engage the article while it is being cut and hold it firmly so as to prevent tearing or twisting.

Importance is attached to the fact that the upper wheels 12 are shiftable from each other and it thus becomes possible for the innermost runs of the chains 13 to adjust themselves automatically to articles of different sizes.

While the machine is particularly designed for cutting pickles, it is to be understood that it can be used equally as well for cutting other products, such as potatoes, apples, etc.

As heretofore stated either or both of the shafts 35 and 36 can be shifted so as to move their gears out of mesh with the gears 31 and 32 on shaft 22. This movement will also be sufficient to carry the blades 41 on shafts 35 and 36 out of the path of the article being cut. Thus it will be seen that instead of cutting the article into four pieces, it can be cut into two or three pieces as desired.

What is claimed is:—

1. A machine for slicing elongated articles, including cutting members mounted to rotate in intersecting planes, and longitudinally extended conveying means extending between and past the cutting members and adapted to engage articles longitudinally thereof while being fed past the cutting members.

2. A machine for slicing elongated articles, including revoluble cutting members, and longitudinally extended conveying belts facing toward and on opposite sides of the revoluble cutting members for engaging an article longitudinally thereof while being cut.

3. A machine for slicing elongated articles, including diverging revoluble cutting members, and a plurality of endless conveying belts between the sides of the cutting members and facing said members.

In testimony that I claim the foregoing as my own, I have hereto affixed my signature in the presence of two witnesses.

SYLVESTER G. LIPSCOMB.

Witnesses:
 DUDLEY C. JONES,
 I. R. MAYNARD.

Copies of this patent may be obtained for five cents each, by addressing the "Commissioner of Patents, Washington, D. C."